(12) United States Patent
Sato et al.

(10) Patent No.: US 6,699,601 B1
(45) Date of Patent: Mar. 2, 2004

(54) MAGNETIC RECORDING MEDIUM, METHOD OF PRODUCING THE MEDIUM, AND MAGNETIC DISK APPARATUS

(75) Inventors: Kenji Sato, Atsugi (JP); Yuki Yoshida, Ebina (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/525,493

(22) Filed: Mar. 15, 2000

(30) Foreign Application Priority Data

Jun. 9, 1999 (JP) .......................... 11-162342

(51) Int. Cl.$^7$ .............. G11B 5/66; G11B 5/70; B05D 5/12; B32B 17/06; B32B 15/04
(52) U.S. Cl. .............. 428/694 TS; 428/336; 428/432; 428/450; 428/611; 428/900; 427/130; 427/131; 427/132
(58) Field of Search ............ 428/694 TS, 336, 428/900, 611, 432, 450; 427/130, 131, 132; 360/113

(56) References Cited

U.S. PATENT DOCUMENTS

| | | | | |
|---|---|---|---|---|
| 4,629,660 A | * | 12/1986 | Sagoi et al. ............... 428/678 |
| 4,724,188 A | * | 2/1988 | Saito et al. ............... 428/457 |
| 5,266,724 A | * | 11/1993 | Kai et al. ............... 562/567 |
| 5,576,908 A | * | 11/1996 | Garfunkel et al. ............. 360/66 |
| 5,935,278 A | * | 8/1999 | Ishitobi et al. ............... 51/306 |
| 6,077,603 A | * | 6/2000 | Zhang ............... 428/332 |
| 6,120,890 A | * | 9/2000 | Chen et al. ............... 428/332 |
| 6,139,981 A | * | 10/2000 | Chuang et al. .......... 428/694 T |

OTHER PUBLICATIONS

Onishi et al., "Substrate Effects on the Magnetic Characteristics of Sputtered Media", IEEE Tran Magn, vol. 25, No. 5, Sep. 1989, pp. 3887–3889.*

* cited by examiner

*Primary Examiner*—Holly Rickman
(74) *Attorney, Agent, or Firm*—Greer, Burns & Crain, Ltd.

(57) ABSTRACT

A magnetic recording medium which has higher S/N and lower manufacturing cost includes a first underlayer including at least one of Co or Cu and P on a non-magnetic substrate, a second underlayer consisting of a non-magnetic material using Cr, and a magnetic layer on the second underlayer.

10 Claims, 5 Drawing Sheets

| Magnetic Disks | First Underlayer (5 nm) | Exposure To Open Air | S/N (dB) |
|---|---|---|---|
| A | CoP | Yes | 27.8 |
| B | CuP | Yes | 26.5 |
| C | CoP | No | 15.6 |
| D | CuP | No | 17.1 |
| E | No P | Yes | 15.7 |
| F | NiP | Yes | 27.5 |
| G | NiP | No | 15.5 |

MAGNETIC RECORDING MEDIUM, METHOD OF PRODUCING THE MEDIUM, AND MAGNETIC DISK APPARATUS

FIELD OF THE INVENTION

The present invention relates to a magnetic recording medium for a hard disk drive and a method of manufacturing the medium, and more particularly, to a medium having a higher signal to noise ratio and lower manufacturing cost.

BACKGROUND OF THE INVENTION

With the development of modern information processing techniques, high recording density is required of a magnetic disk apparatus to be used as an external memory device of a computer. In more practical terms, it is now a trend to use, within a reproducing head of the magnetic disk apparatus, a magneto-resistive head, namely, an MR head utilizing a magneto-resistive element in place of the coil type inductive thin film magnetic head of the prior art. The MR head utilizes the magneto-resistive effect, in which electrical resistance of a magnetic material changes depending on the external magnetic field, for reproduction of a signal on the recording medium. The MR head has several advantages over the inductive thin layer magnetic head of the prior art. Among other things, inductance is smaller and a large signal to noise ration (S/N) can be expected. Moreover, an AMR head utilizing the anisotropic magneto-resistive effect, a GMR head utilizing a gigantic magneto-resistive effect and a spin valve GMR head are also used in addition to such MR heads.

Moreover, in order to satisfy the requirement of high density recording, the magnetic recording medium to be used in the magnetic disk apparatus is also required to have performance characteristics needed for the MR head, AMR head or GMR head (including the spin valve head). The magnetic recording medium is required to have higher coercive force Hc to improve the S/N in view of the high recording density.

In the magnetic recording medium of the prior art, a magnetic layer consisting of an alloy including cobalt is formed on a non-magnetic substrate such as an aluminum substrate. Moreover, a non-magnetic underlayer consisting of Cr or its alloy is provided between the substrate and magnetic layer. This non-magnetic underlayer is intended to set the easy magnetizing direction of the magnetic layer within the layer surface. Particularly, in order to attain the intensity, in the magnetic recording medium using aluminum as the substrate, an NiP layer is formed by the plating and sputtering method on the surface of the substrate.

In order to reduce noise in such a magnetic recording medium, an alloy element is added to reduce the exchange interaction between magnetic particles of the magnetic layer, and the grain size of the magnetic particles forming the magnetic layer is reduced. For example, the Published Unexamined Japanese Patent Application No. S63-148411 discloses a magnetic recording medium which is suitable for high density recording apparatus. In that magnetic recording medium, the magnetic layer includes any one of Ta, Mo, W or an alloy thereof as a third additional element to the Co—Ni based alloy or Co—Cr based alloy.

Another method of reducing noise and obtaining excellent S/N is to perform a texture process in the circumferential direction of an aluminum substrate having a non-magnetic NiP layer at the surface thereof. The direction for easy magnetization of the magnetic layer is further directed to the circumferential direction by performing the texture process of the substrate surface in the circumferential direction. As a result, improvement of S/N can be realized.

In a magnetic disk apparatus to be loaded in a portable apparatus such as a notebook size personal computer or the like, it is desirable to use a non-magnetic substrate such as glass or the like having excellent impact-proof characteristics as the substrate of a magnetic recording medium in place of the aluminum substrate, which is weaker in strength. Many examples of magnetic recording media having glass substrates are reported.

Figure 1:
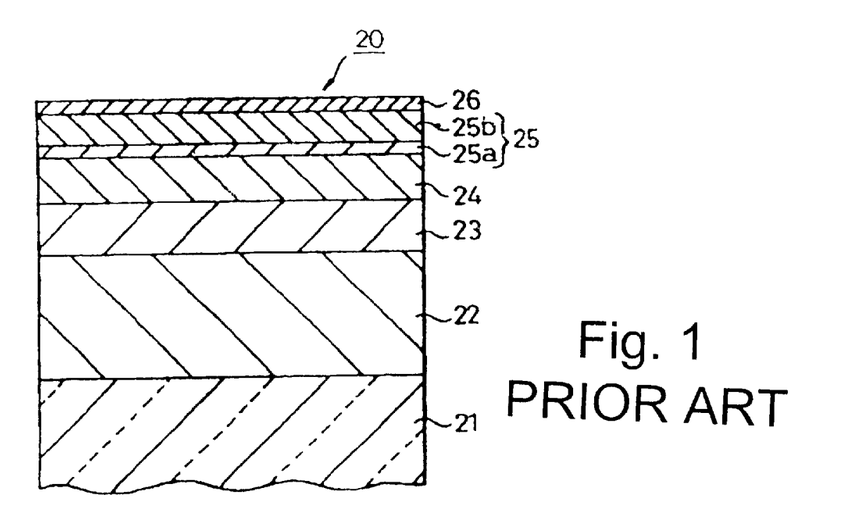
FIG. 1 is a cross-sectional view illustrating an example of a magnetic recording medium of the prior art.

For example, the Published Unexamined Japanese Patent Application No. H7-73427 discloses a magnetic recording medium 20 comprising, as the cross-sectional view is illustrated in FIG. 1, a basic layer including a glass substrate 21, a first layer (including chromium) 22 formed in the non-magnetic substrate side of the glass substrate 1, a second layer (including chromium and molybdenum) 23 formed in the magnetic layer side, and a magnetic layer 24 including cobalt and platinum. On the magnetic layer 24, a protective layer 25 consisting of a chromium layer 25a and a carbon layer 25b is also provided, and a lubricant layer 26 is provided on the protective layer 25.

Figure 2:
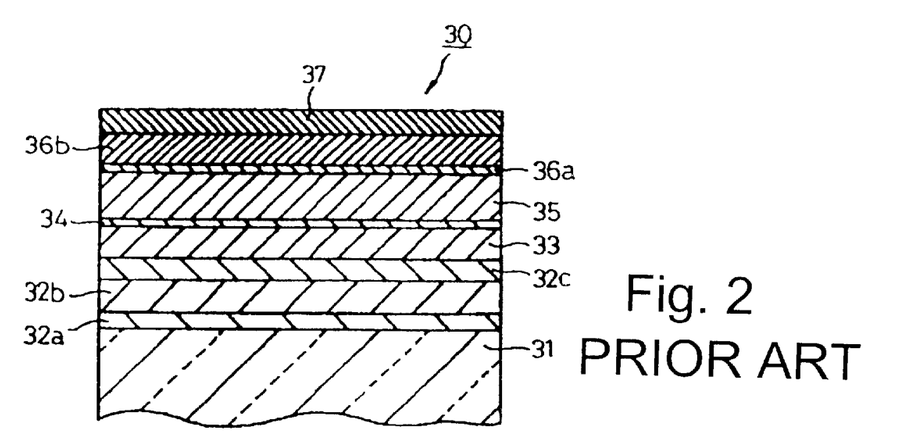
FIG. 2 is a cross-sectional view illustrating another example of a magnetic recording medium of the prior art.

Moreover, the Published Unexamined Japanese Patent Application No. H8-227516 discloses a magnetic recording medium 30 comprising, as the cross-sectional view is illustrated in FIG. 2, a glass substrate 31 and an aluminum (Al) thin layer 32a, a Cr thin layer 32b, a CoMo thin layer 32c, a first magnetic layer 33, a non-magnetic layer 34, a second magnetic layer 35, a first protective layer 36a, a second protective layer 36b and a lubricating layer 37 which are sequentially formed on such a glass substrate.

However, in the magnetic recording medium using a glass substrate, a satisfactory S/N cannot be obtained only by forming directly on the substrate a Cr-based underlayer such as Cr, CrMo. Actually, when a glass substrate is used in the magnetic recording medium, it has been confirmed that medium noise increases abnormally in the ordinary Cr-based underlayer.

Therefore, as another method of obtaining good S/N of the magnetic recording medium having the glass substrate, it is considered to form the NiP layer as the seed layer on the glass substrate by the plating method or sputtering method, and then perform the texture process in the circumferential direction of the NiP layer surface.

However, without relation to a layer forming method to be introduced, bond strength of the NiP layer with the glass substrate is rather poor, and it is essential to promote the strength. As a method for improving the bond strength, for example, it is possible to introduce an adhesive layer such as Cr, Ti under the NiP layer, and form the surface of the glass substrate with a surface roughness (mean value) Ra of about 0.5 μm. However, the former method increases manufacturing processes and the latter method increases costs. Moreover, when the NiP layer is formed by the plating method, the thickness becomes about several μm. The impact resistance of the medium depends to a large extent on the hardness of the NiP layer rather than on the hardness of the substrate. As a result, the impact resistance of the medium is lowered. Moreover, the NiP layer formation by the plating method only provides a smooth surface by conducting the polish process to the surface of the NiP layer.

Accordingly, it is desirable to provide a magnetic recording medium which assures good S/N equivalent to or better than that of an NiP layer, even when the NiP layer is not used.

OBJECTS OF THE INVENTION

Therefore, the first object of the present invention is to provide a magnetic recording medium which assures higher S/N.

The second object of the present invention is to provide a magnetic recording medium which assures higher impact resistance.

The third object of the present invention is to provide a magnetic recording medium with a seed layer having excellent contact property with a glass substrate.

The fourth object of the present invention is to provide a magnetic recording medium which is easier to manufacture.

SUMMARY OF THE INVENTION

A magnetic recording medium of the present invention has a first underlayer formed on a non-magnetic substrate to include material having any one of Co and Cu added to P. The medium also has a second underlayer consisting of Cr-based non-magnetic material between the first underlayer and the magnetic layer.

According to the present invention, the recording density of the magnetic recording medium can be improved because a S/N ratio similar to that of magnetic recording media having a NiP layer can be obtained by providing the first underlayer on the substrate. The S/N can be further improved by performing an oxidation process to the surface of the first underlayer. Moreover, the first basic layer of the present invention assures good adhesion property with glass, unlike the NiP layer, and does not require an adhesive layer to enhance adhesive property with the glass substrate. Therefore, manufacture can be simplified and manufacturing cost can also be reduced. In addition, since adhesive property of the first underlayer and glass substrate can be improved, use of the glass substrate is easier and higher impact resistance can be assured.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

The present invention will be explained in detail with reference to the preferred embodiments thereof.

In a magnetic recording medium of the present invention, a magnetic layer consisting of a magnetic metal material is provided on a non-magnetic substrate, and a Cr-based underlayer including Cr as the main material is provided between the substrate and magnetic layer to make an axis of easy magnetization of the magnetic layer direct to the longitudinal directions within the layer surface. Various layer structures are within the scope of the present invention.

Figure 3:
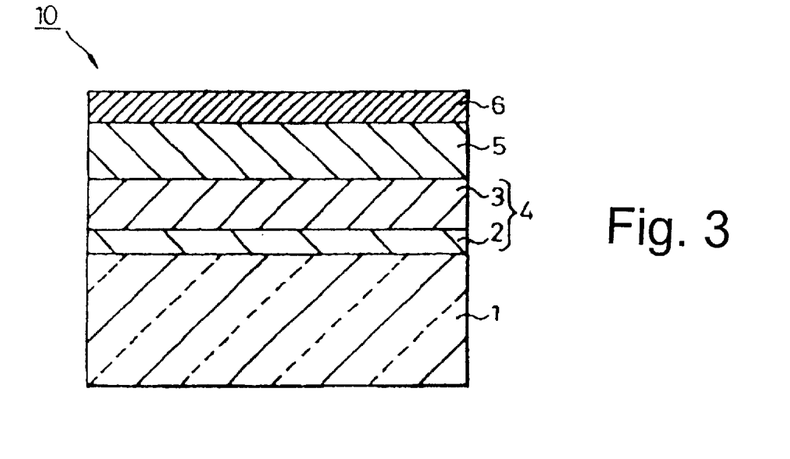
FIG. 3 is a cross-sectional view of a magnetic recording medium of the present invention.

FIG. 3 is a cross-sectional view of the magnetic recording medium of the first embodiment of the present invention.

A magnetic recording medium 10 may be formed by providing a magnetic layer 5 consisting of a magnetic metal material on a non-magnetic substrate 1 via a basic or underlayer layer 4. The underlayer 4 provided between the substrate 1 and magnetic layer 3 is composed of an additional underlayer 2 (hereinafter, referred to as "first underlayer") provided adjacent to the substrate 1. The underlayer 2 uses one of Co and Cu as the main material, and P. The underlayer 4 also has a Cr-based underlayer 3 (hereinafter referred to as "second underlayer") for setting the axis of easy magnetization of the magnetic layer 5 within the layer surface. The underlayer 3 uses chromium as the main material.

The magnetic layer 5 has an axis of easy magnetization in the circumferential direction and may be formed of a desired magnetic metal material (alloy) including Co as the main material, as will be explained later in detail. The alloy forming the magnetic layer 5 is preferably capable of including Cr and Pt in addition to cobalt, and can also combine Ta, Nb and B, etc. In addition, a protective layer 6 forms the upper most layer as is generally known in this technical field. The protective layer 6 is preferably formed of carbon or diamond-like carbon (DLC).

In the magnetic recording medium of the present invention, the nonmagnetic substrate used as the base element may be formed of glass or non-magnetic material of this kind. As an adequate substrate material, glass, carbon, or silicon may be listed although the substrate is not particularly limited to those materials. In the embodiment of the present invention, it is preferable to use a glass substrate and therefore use of such glass substrate will mainly be explained.

The glass substrate can be selected from the glass substrates used in general in this technical field. As an adequate glass substrate, soda-lime glass, aluminosilicate glass, non-alkali glass, or crystallized glass, for example, may be listed, although other suitable materials may also be used. These glass substrates may have different levels of roughness for tribology purposes.

Moreover, such glass substrates are preferably used after cleaning the surface. The cleaning process for the glass substrate surface can be performed by the ordinary method. For example, a degreasing process using, for example, ultra-pure water, alkali cleanser and neutralized cleanser, etc. and a cleaning process using ion exchange water may be combined. Moreover, it is also possible to perform, as required, an activation process of the substrate surface.

In the magnetic recording medium of the present invention, the underlayer 4 provided between the glass substrate and magnetic layer is formed, as explained above, of at least a first underlayer 2 and a second underlayer 3. For this embodiment of the present invention, the first underlayer 2 is provided adjacent to the glass substrate. Particularly, in the present invention, the first underlayer 2 is provided in close contact with the substrate 1, to prevent an adverse effect of the substrate on the underlayer body (second underlayer 3), which has been a problem in the prior art.

The first underlayer 2 is capable of functioning as a barrier layer to prevent particular adverse effects of the first substrate 1 on the second underlayer 3, and also as an adhesive layer to improve bond strength of the second underlayers and the substrate 1. This first underlayer 2 may usually have a structure that includes P added to any one of Co or Cu, or a structure formed of a three element alloy such as CoCuP. It is essential for the first underlayer 2 to include P. Although the concentration thereof may be changed depending on the desired effect, it is usually set in the range from about 10 to 30 at %.

According to the present invention, when the concentration of P of the first CrP-based underlayer is 10 at % or higher, a more distinctive effect of the surface oxidation may be obtained, as will be explained later.

The first underlayer 2 may preferably be formed under ordinary layer forming conditions, for example, by the magnetron sputtering method and sputtering method. As an adequate layer forming condition, it is considered, for example, that the layer forming temperature can be about 25 to 250° C., Ar gas pressure of about 1 to 10 (mTorr) and DC negative bias of 0 to −300V. Moreover, other layer forming methods, for example, the evaporation method, ion beam sputtering method or the like may be used in place of the sputtering method as required. Layer thickness of the first underlayer 2 may vary widely depending on the desired effect, but it is usually selected in the range of about 5 to 100 nm.

Moreover, it is preferable for the first underlayer 2 to have an oxidized surface and have the second underlayer stacked on the surface thereof. The oxidized surface described above has been found to have a large effect on the operation of the first underlayer 2. As a technique for performing the oxidation process to the first underlayer 2, the magnetic recording medium having the first underlayer 2 is then exposed easily to open air before formation of the second underlayer.

As a result of the oxidation process to the surface of the CrP-based underlayer, S/N may be improved by about 6 to 8 dB, corresponding to the effect obtained when the NiP layer is formed on the substrate. A similar improvement of S/N cannot be recognized even when a similar oxidation process is performed to the Cr and CrMo underlayer. In addition, it should be noted that unlike the NiP layer, the first underlayer 2 not only makes unnecessary provision of the close contact layer such as Cr, Ti or the like but also realizes higher hardness and equal electromagnetic conversion characteristics.

In addition to the oxidation process explained above, it is preferable for the first underlayer 2 that the mechanical texture process be performed to the surface thereof. Namely, the first underlayer 2 is preferably used under the condition that shallow and linear projected portions and projected and recessed portions are formed at the surface in the circumferential direction. The texture process at the surface of the underlayer may be performed mechanically depending on the technique which is usually used in the manufacture of the magnetic recording medium. An adequate texture process can include polishing the surface of the underlayer with polishing means such as a grind stone, polishing tape or isolated grind particles. The S/N is improved and the running property of the head to write or read data to or from the medium is also improved by performing the mechanical texture process to the surface of the first underlayer 2 to form the projected and recessed portions in the circumferential direction.

In the magnetic recording medium of the present invention, the magnetic layer 5 is provided on the second underlayer 3. The second underlayer 3 uses Cr as the main material formed on the first underlayer 2 explained above. The second underlayer 3 may be formed of a metal material including only Cr as the main material, or a metal material including Cr and Mo as the main material. Particularly, when the magnetic layer 5 includes Pt, the second underlayer 3 which is provided just under the magnetic layer 5 is preferably formed of a metal material including Cr and Mo as the main material. Namely, with the addition of Mo, the interval of the lattice surface may be widened. Moreover, preferential alignment to the surface of the C-axis of the magnetic layer (CoCr-based alloy) may be promoted by approximating the lattice surface interval of the underlayer to the lattice surface interval of the magnetic recording layer widening, depending on the composition of the magnetic recording layer, particularly of the amount of Pt to be added. As an example of adequate material for the second underlayer 3, Cr, CrW, CrV, CrTi, CrMo, etc. may be used. The second underlayer 3 can preferably be formed under ordinary layer forming conditions, for example, by a sputtering method such as the magnetron sputtering method. In the adequate layer forming condition, the layer forming temperature is set to about 150 to 300° C., Ar gas pressure is ranged from about 1 to 10 (mTorr) and DC negative bias is ranged from about 100 to 300° C. Moreover, as required, the other layer forming methods, for example, the evaporation method and ion beam sputtering method, etc. may be used as required in place of the sputtering method.

The thickness of the second underlayer 3 may be changed to include a wider range depending on various factors, but it is preferable that the thickness be ranged from about 5 to 60 nm in view of improving the S/N. If the thickness of the second underlayer is lower than 5 nm, sufficient magnetic characteristics may be lost, and if it is larger than 60 nm, noise tends to be increased.

In the magnetic recording medium of the present invention, the magnetic layer 5 may be formed, as is performed in general in this technical field, of an alloy including cobalt as the main material, for example, the Co—Ni based alloy and Co—Cr based alloy, etc. and it is particularly preferable that it be formed of the Co—Cr based alloy. Moreover, the magnetic layer 5 may also be formed of other elements, for example, such as 3-element alloy, 4-element alloy or 5-element alloy adjusted by freely adding platinum, tantalum, niob, boron, tungsten and carbon, etc. and it is preferable to form the magnetic layer 5 with such multi-element alloy. As explained later in detail, it has been found that the magnetic layer 5 is preferably formed of a Co—Cr based alloy including Cr in the concentration of 17 at % or more. For reference purposes, when the first underlayer 2 does not exist on the glass substrate, enhancing the concentration of Cr in the magnetic layer can lower noise. The direction of easy magnetization is easily directed toward the vertical direction if the Cr concentration of the magnetic layer peaks at 15 at %, and exceeds such peak value, but S/N is lowered. In other words, the first underlayer 2 shows its maximum effect when the magnetic layer has a higher concentration of Cr.

Moreover, the magnetic layer 5 may be a single layer as illustrated in FIG. 3, or may be a multi-layer comprising two or more layers. In the case of the multi-layer structure, a non-magnetic layer is provided as the intermediate layer of the magnetic layer.

In more practical terms, the magnetic layer used in the magnetic recording medium of the present invention preferably sets its direction of easy magnetization in the God circumferential direction. The magnetic layer includes cobalt as the main material and also includes chromium and platinum. Moreover, it may be formed of a 4-element based alloy of a 5-element based alloy including tantalum and combining tantalum and NiOB. Here, the amount of chromium and platinum used in combination with cobalt as the main material is preferably in the range of about 17 to 25 at % in Cr, and about 4 to 15 at % in Pt.

Without relation to the composition, particularly without relation to the structure of 4-element based alloys or 5-element based alloys, the magnetic recording medium 10 of the present invention preferably includes Mrt of about 0.24 to 0.95(memu/cm$^2$). Since the magnetic layer 5 of the present invention is formed thinner than the magnetic layer of the prior art, this magnetic layer is suitable for use as the magnetic layer of a medium from which data is read by the inductive head as well as the MR head.

The magnetic layer 5 explained above may be formed preferably under the particular layer forming condition. As for the sputtering method, like the formation of the underlayer explained above, the magnetron sputtering method, for example, may be introduced. Under the adequate layer forming condition, the layer forming temperature is set, for example, to about 250° C., Ar gas pressure is set to about 1 to 10 (mTorr), and DC negative bias ranges from about 80 to 400V. Moreover, other layer forming methods, for example, the evaporation method or the ion beam sputtering method may be used in place of the sputtering method as required. In the preferable example of formation of the magnetic layer 5, the layer may be formed from the element groups explained above at the layer forming temperature of about 150 to 350° C. by the sputtering method under DC negative bias.

In the magnetic recording medium of the present invention, it is preferable that all of the magnetic layer 5 and underlayer 4 be formed by the sputtering method. Namely, such an excellent effect as maintaining the impact resistance of the glass substrate 1 can be obtained by forming all layers with the sputtering method and adjusting the thickness of the respective layers to the value lower than the predetermined thickness.

Moreover, the magnetic recording medium 10 of the present invention is preferably capable of providing a protective layer 6 at the upper part of the magnetic layer 5 as the upper most layer, as required. As an adequate material of the protective layer, for example, the layer consisting of carbon or a compound thereof, for example, C layer, WC layer, SiC layer, B$_4$C layer, C layer including hydrogen or diamond-like carbon (DLC) layer, which is recently attracting attention because of its improved hardness may be used. Particularly, for this embodiment of the present invention, the protective layer consisting of carbon or DLC may preferably be used. Such protective layer may be formed, for example, by the sputtering method and the evaporation method in place of the ordinary method. The thickness of such a protective layer may be varied in a wider range depending on various factors, but preferable values are ranged from about 4 to 10 nm.

In place of the protective layer explained above, for example, the amorphous hydrogenated carbon layer (a-C:H layer) disclosed in Japanese Published Unexamined Patent Application No. HEI 5-81660 or a protective layer similar to such layer may be used. Moreover, Japanese Published Unexamined Patent Application No. HEI 6-349054 discloses that a carbon protective layer including hydrogen formed by the sputtering method is formed, to realize improvement in the durability of CSS and reduction of thickness, by the double-layer structure of the carbon layer of the lower layer having a low hydrogen content, and the carbon layer of the higher layer having a high hydrogen content. Moreover, in place of the sputter a-C:H layer, the amorphous hydrogenated carbon layer (PCVDa-C:H layer) formed by the plasma CVD method is also recently disclosed. For example, Japanese Published Unexamined Patent Application No. HEI 7-73454 discloses a carbon protective layer manufacturing method characterized in that CH$_4$ gas, CF$_4$ gas are used as the reaction gas in the plasma CVD method.

The magnetic recording medium of the present invention also allows that a fluorocarbon resin based lubricating layer be formed on the protective layer 6 explained above.

Moreover, according to another aspect, the present invention relates to a magnetic disk apparatus utilizing the magnetic recording medium of the present invention. The magnetic disk apparatus of the present invention, although the structure is not limited, basically includes a recording head for recording information to the magnetic recording medium and a reproducing head for reproducing the information. Particularly, the reproducing head is preferably provided with a magneto-resistive head, namely the MR head utilizing the magneto-resistive element in which an electric resistance changes depending on the intensity of an applied magnetic field.

Figure 4:
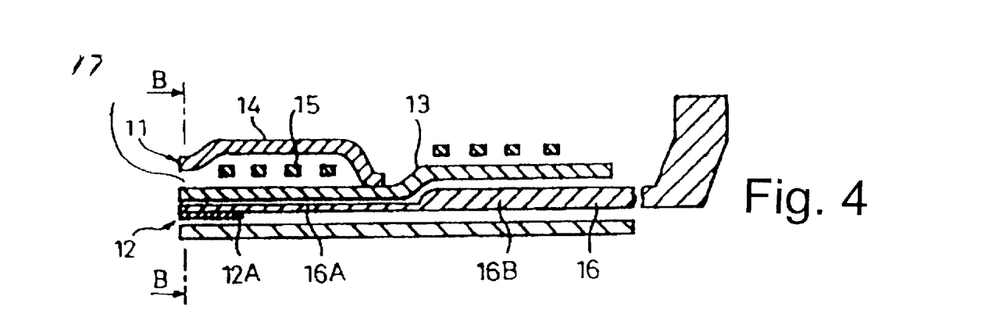
FIG. 4 is a diagram illustrating a head of a magnetic disk apparatus which uses the present invention.
Figure 5:
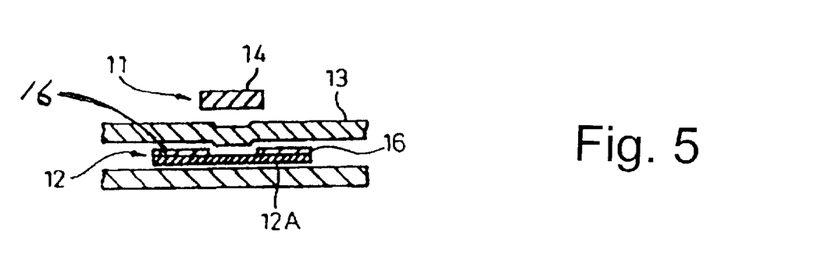
FIG. 5 is a cross-sectional view of the head of FIG. 4 taken along line B—B.

The magnetic disk apparatus of the present invention is preferably provided with a structure which stacks the recording head and reproducing head as illustrated in FIG. 4 and FIG. 5. FIG. 4 is a plan view of the magnetic disk apparatus of the present invention, while FIG. 5 is a cross-sectional view along the line B—B in FIG. 4.

FIG. 4 and FIG. 5 show an induction type recording head 11 for recording information to the magnetic recording medium, and a magneto-resistive reproducing head 12 for reading information. The recording head 11 is composed of a lower magnetic pole (upper shield layer) 13 consisting of NiFe or the like, an upper magnetic pole 14 consisting of NiFe, etc. opposed to the lower magnetic pole 13, and a coil 15 for exciting these magnetic poles 13, 14 to record the information to the magnetic recording medium at a recording gap 17.

The reproducing head 12 is preferably formed of the AMR head or GMR head. A pair of conductive layers 16 for supplying a sense current to a magneto-resistive element 12A are provided, with the interval between them corresponding to the recording track width. Here, in the conductive layer 16, an area 16A near the magneto-resistive element 12A is formed relatively thin and another area 16B is formed relatively thick.

In the structure illustrated in FIG. 4 and FIG. 5, the conductive layer 16 is formed thinner at the area 16A near the magneto-resistive element 12A and therefore curvature of the lower magnetic pole (upper shield layer) 13 is small. Accordingly, the recording gap provided opposed to the magnetic recording medium is not very curved and the magnetic disk apparatus can accurately read the information even if there is a certain deviation between the position on the track of the magnetic head when writing and the position on the track of the magnetic head during the read operation. Therefore, it is possible to avoid read errors even when the allowed offtrack amount is rather small.

Meanwhile, since the conductive layer 16 is formed relatively thick in the area 16B near the magneto-resistive element 12A, the total resistance of the conductive layer 16 can be set small. As a result, it is now possible to detect changes of resistance of the magneto-resistive element 12A with a higher sensitivity, and thereby S/N can also be improved. Moreover, heat generation of the conductive layer 16 can be reduced and generation of noise resulting from heat generation can also be prevented.

The magneto-resistive magnetic head explained above may be manufactured by cutting the head substrate for each head after forming many heads on a ceramic head substrate using the thin layer technology, and then processing such substrate into the predetermined shape.

Figure 6:
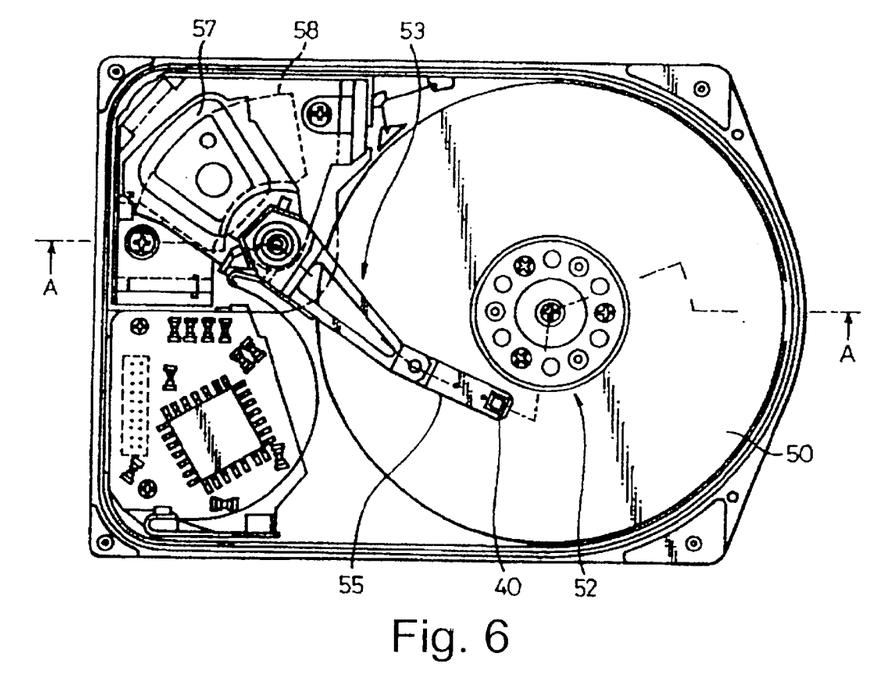
FIG. 6 is a plan view of a magnetic disk apparatus which uses the present invention.
Figure 7:
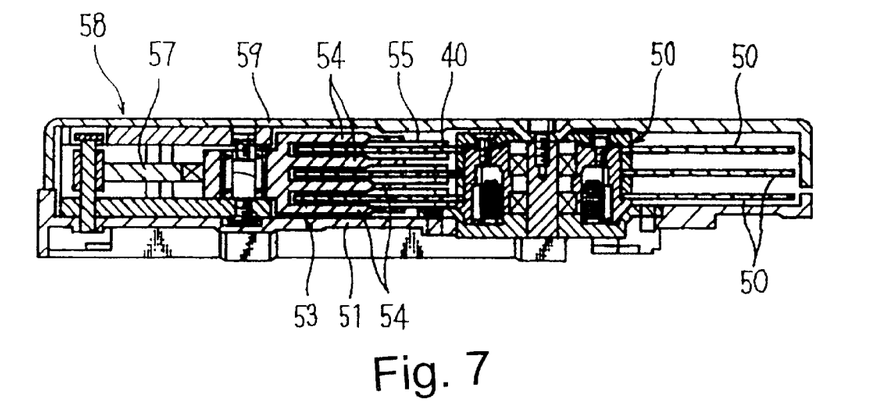
FIG. 7 is a cross-sectional view of the magnetic disk apparatus of FIG. 6 taken along line A—A.

In addition, the magnetic disk apparatus of the present invention is as illustrated in FIG. 6 and FIG. 7. FIG. 6 is a plan view of the magnetic disk apparatus (cover is removed) and FIG. 7 is a cross-sectional view along the line A—A of FIG. 6.

In these figures, reference numeral 50 designates a plurality of magnetic disks (three disks) as the magnetic recording media to be driven to rotate by the spindle motor 52 provided on the base plate 51.

An actuator 53 is provided to rotate on the base plate 51. At one rotating end of the actuator 53, a plurality of head arms 54 extending in the recording surface direction of magnetic disk 50 are formed. At the rotating end of this head arm 54, a spring arm 55 is mounted. Moreover, a slider 40 explained above is mounted to be tilted via the insulating layer (not illustrated) to the flexure of the spring arm 55. On the other hand, a coil 57 is provided on the other rotating end of the actuator 53.

On the base plate 51, a magnetic circuit 58 formed of a magnet and yoke is provided and the coil 57 explained above is arranged within the magnetic gap of this magnetic circuit 58. The magnetic circuit 58 and coil 57 form a moving coil type linear motor (VCM: voice coil motor). The upper part of the base plate 51 is covered with the cover 59.

Next, operations of the magnetic disk apparatus in the structure explained above will be explained. When the magnetic disk 50 is in the stop condition, the slider 40 is also in the stop condition in contact with a saving (or parking) zone of the magnetic disk 50.

Next, when the magnetic disk 50 is driven to rotate at a higher speed by the spindle motor 52, the slider 40 floats from the disk surface in a minute interval with the air flow generated by rotation of the magnetic disk 50. When a current is applied to the coil 57 under this condition, a propulsive force is generated in the coil 57, causing the actuator 53 to rotate. Thereby, the head (slider 40) may be moved to the desired track of the magnetic disk 50 to perform the data read/write operation.

In this magnetic disk apparatus, the layer where the area near the magneto-resistive element is formed thinner and the other part is formed thick is used as the conductive layer of the magnetic head. Curvature of the magnetic pole of the recording head can be set small, resistance of the conductive layer is reduced and information can be read accurately with high sensitivity.

The results obtained with the present invention will now be explained with reference to its typical embodiment compared with known devices.

1. Manufacture of Magnetic Recording Media

On a disk type aluminosilicate glass substrate having a chemically reinforced and well cleaned surface, a layer including P as the first underlayer (seed layer) 2 and $CrMo_{10}$ (at %) layer as the second underlayer 3 are sequentially formed.

Before formation of the first underlayer, the inside of the sputtering chamber is evacuated to $5 \times 10^{-8}$ Torr or less, and is maintained at 5 mTorr through introduction of Ar gas. In the formation of the first underlayer, a target of $Co_{80}P_{20}$ (at %) or $Cu_{84}P_{16}$ is used. Moreover, in order to evaluate the difference of effects resulting from differences of layer thickness, layer thickness of the first underlayer is changed within the range from 0 nm (not forming a layer) to 100 nm. After formation of the first underlayer, the sputtering chamber is opened to the atmospheric condition and the first underlayer is exposed to the open air.

The substrate exposed to the open air is put again into the sputtering chamber. Before the formation of the second underlayer, the inside of the sputtering chamber is evacuated to $5 \times 10^{-8}$ Torr or less. At the time of forming the second underlayer, the substrate is heated up to 250° C., and a CrMo layer is formed in the thickness of about 25 nm on the first underlayer.

After the second underlayer is formed, the $Co_{72}Cr_{19}Pt_5Ta_2Nb_2$ (at %) magnetic layer is formed by the sputtering method from the alloy target so that its tBr is in the range from 40 to 120 G$\mu$m (corresponding to a thickness of 15 to 35 nm).

Figure 8:
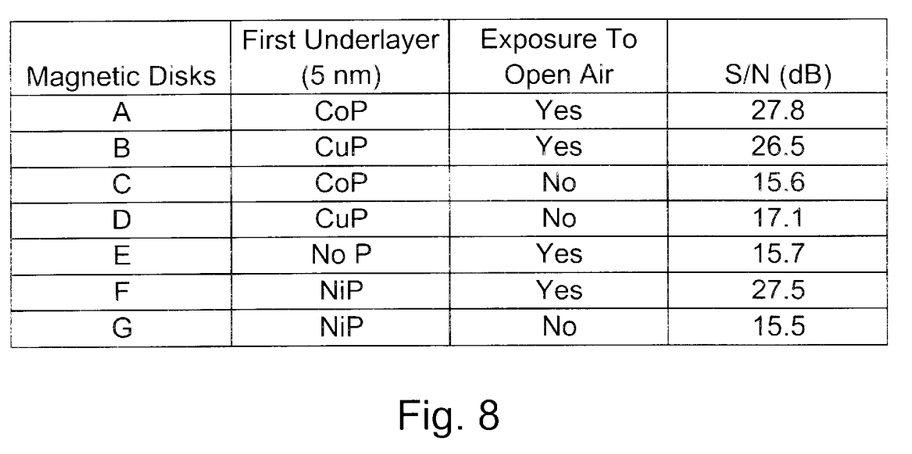
FIG. 8 is a table illustrating S/N of several magnetic disks.

Referring to FIG. 8, with the processes explained above, a magnetic disk A (underlayer is $Co_{80}P_{20}$) and magnetic disk B (underlayer is $Cu_{84}P_{16}$) made in accordance with the present invention have been made.

Moreover, with the method similar to that explained above, magnetic disks C, D, E, F and G have been manufactured for comparison with the disks A and B. However, each magnetic disk has the following differences from the disks A and B.

Magnetic disk C: Exposure to the open air for the CoP layer of the magnetic disk A is omitted.

Magnetic disk D: Exposure to the open air for the CuP layer of the magnetic disk B is omitted.

Magnetic disk E: $Cr_{90}Mo_{10}$ is used as the first underlayer. The CrMo layer is formed in the thickness of 100 nm under the layer forming condition similar to that for the second underlayer and it is then exposed to the open air.

Magnetic disk F: The NiP layer is used as the first underlayer (seed layer). The NiP layer is formed in the thickness of 100 nm using the $Ni_2P$ target under the layer forming condition similar to that for the CoP layer and CuP layer and is exposed to the open air. However, a close contact layer consisting of Cr is provided between the substrate and NiP layer.

Magnetic disk G: Exposure to the open air for the NiP layer of the magnetic disk F is omitted.

2. Evaluation of the Magnetic Disks

For the magnetic disks A and B manufactured in example 1 and the magnetic disks C to G made for comparison purposes, measurement of S/N using isolated pulses was conducted. For analysis of composition, EDX was used and for measurement of magnetic field, VSM was used. Measurement of S/N was conducted based on the isolated pulse output in the read width 1 $\mu$m and the effective value of medium noise in the recording density 160 kFCI. Namely, S/N=20 log($S_{RMS}/N_{RMS}$).

FIG. 8 illustrates the results of measurement for each magnetic disk. Result for the magnetic disks A, B, C and D illustrated in FIG. 8 correspond to the case where the thickness of the first underlayer (seed layer) is 5 nm.

Figure 9A:
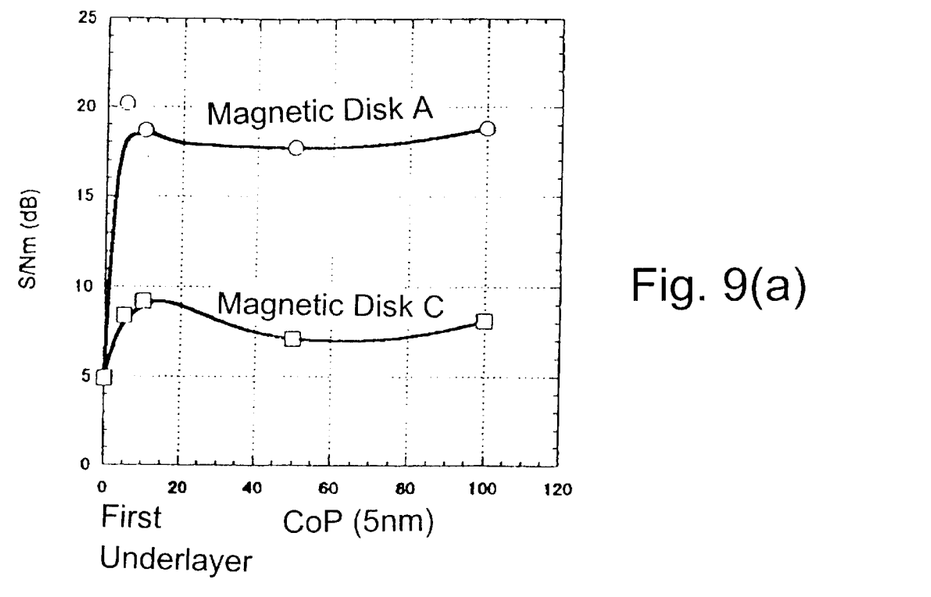
FIG. 9(a) is a graph showing the S/N as a function of the thickness of a CoP underlayer.
Figure 9B:
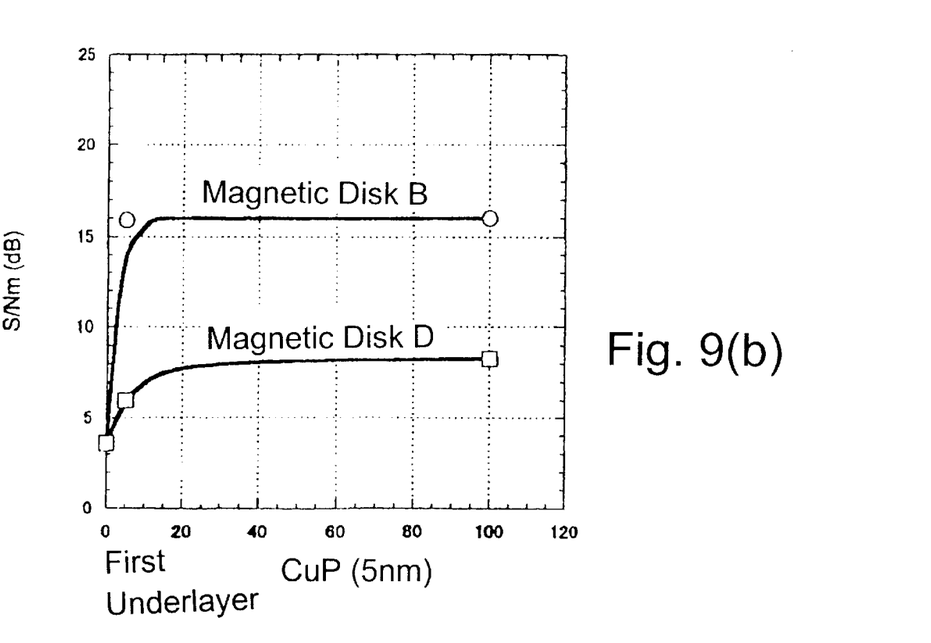
FIG. 9(b) is a graph showing the S/N as a function of the thickness of a CuP underlayer.

FIG. 9 is a graph indicating the thickness of the seed layer vs. the isolated S/N characteristic of the magnetic disks A, B, C and D. In FIG. 9, FIG. 9(a) illustrates the characteristics of the magnetic disks A and C, while FIG. 9(C) illustrates the characteristics of the magnetic disks B and D.

According to this embodiment, as illustrated in FIG. 8, it can be understood that the S/N similar to that of the magnetic disks F and G as the disk of the prior art in which the NiP layer is provided on the substrate can be obtained by providing the underlayer including CoP or CuP.

On the other hand, as understood from the characteristic of the magnetic disk E as the disk of the prior art in which CrMo is used in place of the underlayer including P, high S/N cannot be obtained using the layer not including P as the underlayer.

Moreover, as illustrated in FIG. 9, rapid rise of S/N has been observed until the layer thickness of the first underlayer (seed layer) reaches about 5 nm, but a significant change of S/N cannot be observed in the range larger than 5 nm. Namely, since the S/N of the isolated pulse does not change in the range from about 5 to 100 nm of the thickness of the first underlayer, a wide margin of thickness is also assured.

Moreover, there are no practical problems with respect to close contact with the substrate and the strength of the first underlayer consisting of CoP or CuP. Moreover, a texture process need not be performed to the underlayer of each medium, but a larger S/N can be expected by performing the texture process.

It is possible to provide a magnetic recording medium which assures higher S/N and high density recording by providing P-based material other than NiP between the Cr-based underlayer and glass substrate as explained in the present invention. Therefore, large capacity of the magnetic disk apparatus can be realized by utilizing the magnetic recording medium of the present invention.

Since the P-based underlayer of the present invention assures good close contact with the substrate using glass or similar non-magnetic material, formation of a close contact layer and roughness of the surface of the glass substrate are unnecessary. Therefore, it is now possible to acquire higher strength and to provide an easily manufactured magnetic recording medium.

While the principles of the invention have been described above in connection with specific apparatus and applications, it is to be understood that this description is made only by way of example and not as a limitation on the scope of the invention.

What is claimed is:

1. A magnetic recording medium comprising:
   a non-magnetic substrate including a material selected from the group consisting of glass, carbon and silicon;
   a magnetic layer;
   a first underlayer in contact with said substrate and consisting of Cu and P; and
   a second underlayer formed between said first underlayer and said magnetic layer and composed of a non-magnetic material including Cr.

2. The magnetic recording medium as claimed in claim 1, wherein an oxide film is formed on the surface of said first underlayer.

3. The magnetic recording medium as claimed in claim 1, wherein the concentration of P of said first underlayer is in the range of from about 10 to 30 at %.

4. The magnetic recording medium as claimed in claim 1, wherein the thickness of said first underlayer is in the range of from about 5 to 100 nm.

5. The magnetic recording medium as claimed in claim 1, wherein the thickness of said second underlayer is in the range of from about 5 to 60 nm.

6. The magnetic recording medium as claimed in claim 1, wherein a texture process is performed on the surface of said first underlayer.

7. A method of producing a magnetic recording medium comprising the steps of:
   depositing a first underlayer consisting of Cu and P so as to be in contact with a substrate including a material selected from the group consisting of glass, carbon and silicon;
   depositing a second underlayer including Cr on said first underlayer; and
   depositing a magnetic layer on said second underlayer.

8. The method as claimed in claim 7, further comprising the step of exposing said first underlayer to the open air before depositing said second underlayer.

9. A magnetic disk apparatus comprising:
   a magnetic recording disk wherein a first underlayer consisting of Cu and P is in contact with a non-magnetic substrate including a material selected from the group consisting of glass, carbon and silicon, a non-magnetic second underlayer including Cr is formed on said first underlayer and a magnetic layer is formed on said second underlayer;
   a spindle motor for rotating said magnetic recording disk;
   a magnetic head for writing or reading data to or from said magnetic recording disk; and
   an actuator for moving said magnetic head in the radial direction of said magnetic recording disk.

10. The magnetic disk apparatus as claimed in claim 9, wherein said magnetic head has a magneto-resistive transducer.

* * * * *